United States Patent
Kraus

(10) Patent No.: US 6,322,126 B1
(45) Date of Patent: Nov. 27, 2001

(54) VISOR SUPPORT APPARATUS

(75) Inventor: Willi Kraus, Gruenstadt (DE)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/469,054

(22) Filed: Dec. 21, 1999

(51) Int. Cl.$^7$ ....................................................... B60J 3/00
(52) U.S. Cl. ............................. 296/97.9; 24/297; 24/607
(58) Field of Search ................... 296/97.9, 214; 24/297, 453, 606, 607, 597, 590; 248/231.81, 316.7, 313

(56) References Cited

U.S. PATENT DOCUMENTS

| | | |
|---|---|---|
| 4,981,322 | 1/1991 | Dowd et al. . |
| 4,981,323 | 1/1991 | Dowd et al. . |
| 5,105,521 | 4/1992 | Dowd et al. . |
| 5,358,299 | * 10/1994 | Seto . |
| 5,411,310 | * 5/1995 | Viertel et al. . |
| 5,507,545 | * 4/1996 | Krysiak . |
| 5,560,575 | 10/1996 | Krysiak . |
| 5,560,669 | * 10/1996 | Gute . |
| 5,567,098 | 10/1996 | Gordon . |
| 5,868,370 | * 2/1999 | Nivet . |

FOREIGN PATENT DOCUMENTS

| | | |
|---|---|---|
| 8110343 | 9/1981 | (DE) . |
| 4333494 | * 4/1994 | (DE) . |
| 4326661 | 2/1995 | (DE) . |
| 19724401 | 12/1997 | (DE) . |
| 19718693 | 5/1998 | (DE) . |
| 0596753 | 5/1994 | (EP) . |
| 0691230 | 1/1996 | (EP) . |

* cited by examiner

*Primary Examiner*—Joseph D. Pape
*Assistant Examiner*—Scott Carpenter
(74) *Attorney, Agent, or Firm*—Tarolli, Sundheim, Covell, Tummino & Szabo L.L.P.

(57) ABSTRACT

An apparatus (30) for supporting a visor (10) in a vehicle (14) that has a roof panel (122) and a headliner (100) that covers the roof panel includes a clip (40) for receiving a part (32) of the visor. The clip (40) includes a body portion (42). At least one flange (60, 62) extends from the body portion (42) and is insertable into an opening (106, 124) that extends through the headliner (100) and the roof panel (122) such that a portion (112) of the headliner (100) is trapped between the flange and the body portion to connect the clip (40) to the headliner. At least two legs (72) extend from the body portion (42) through the opening (124). A pin (80), which is connected to the body portion (42), is movable from a first position to a second position when the part (32) of the visor (10) is received by the clip (40). When the pin (80) is in the second position, the pin urges the legs (72) against edges (126) of the opening (124) in the roof panel (122) to connect the clip (40) to the roof panel. The clip (40), the flange (60, 62), the legs (72) and the pin (80) are constructed of a single piece of homogeneous material.

33 Claims, 4 Drawing Sheets

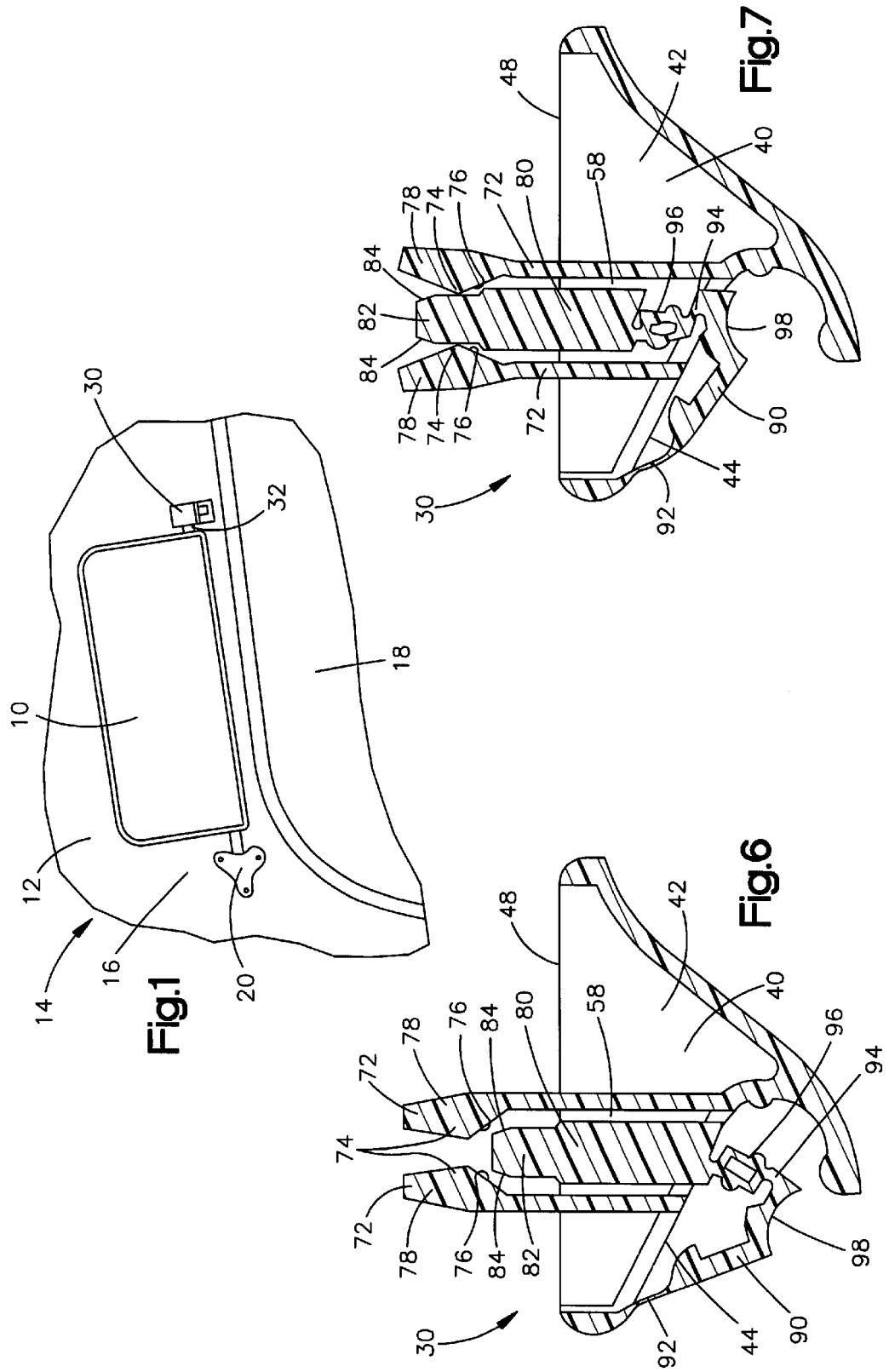

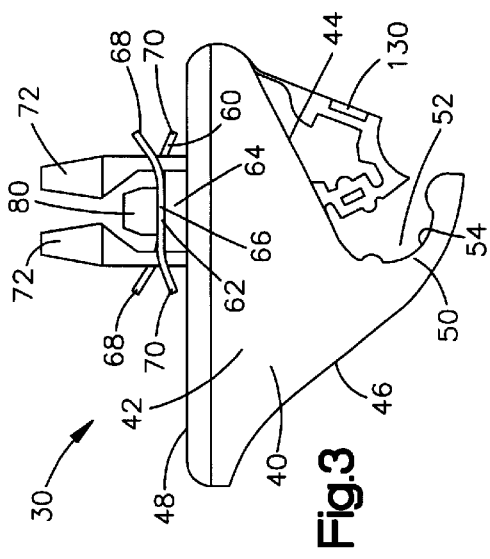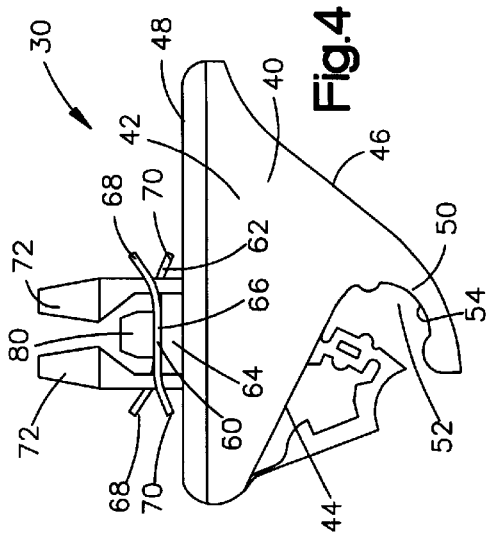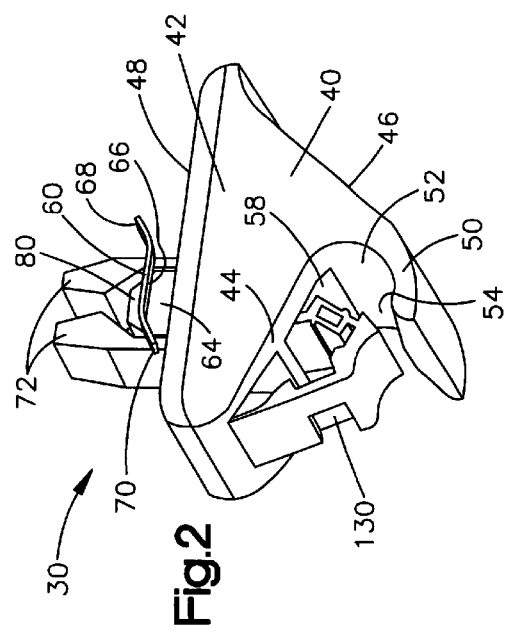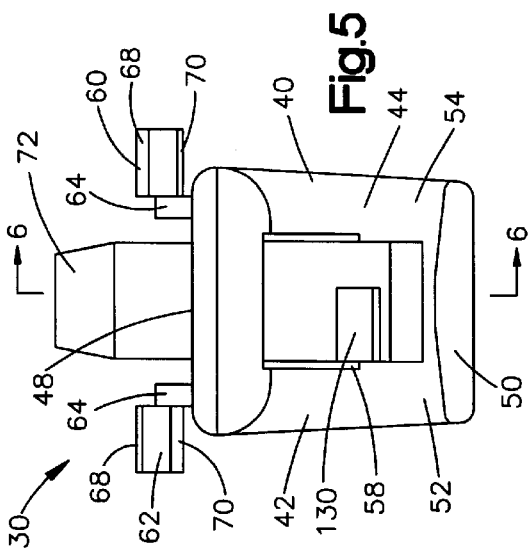

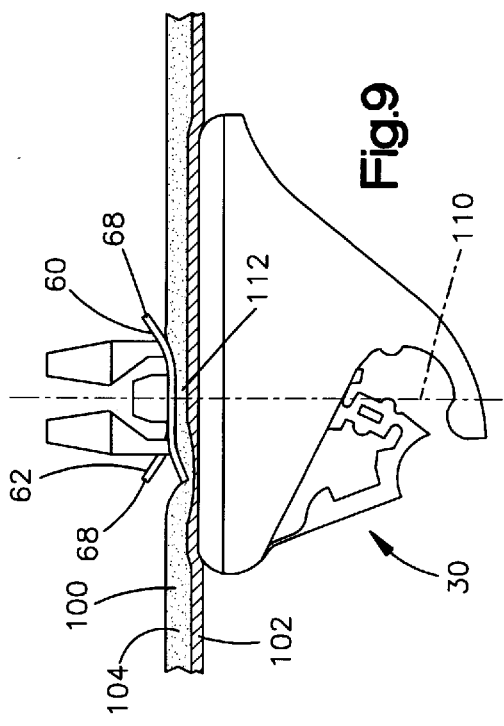
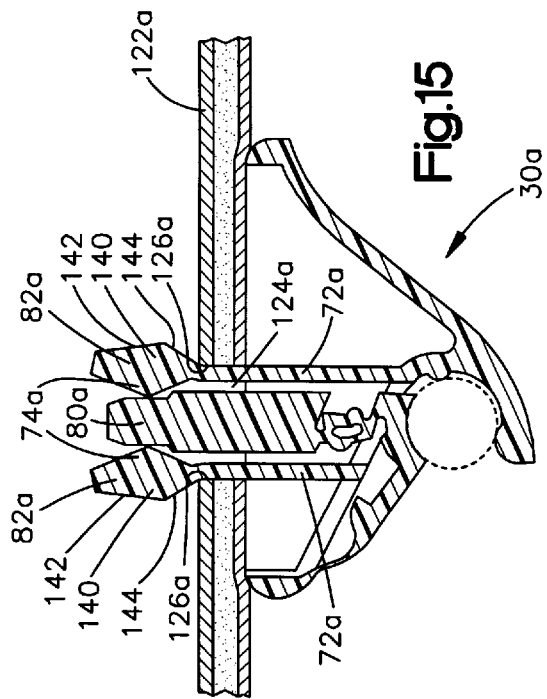
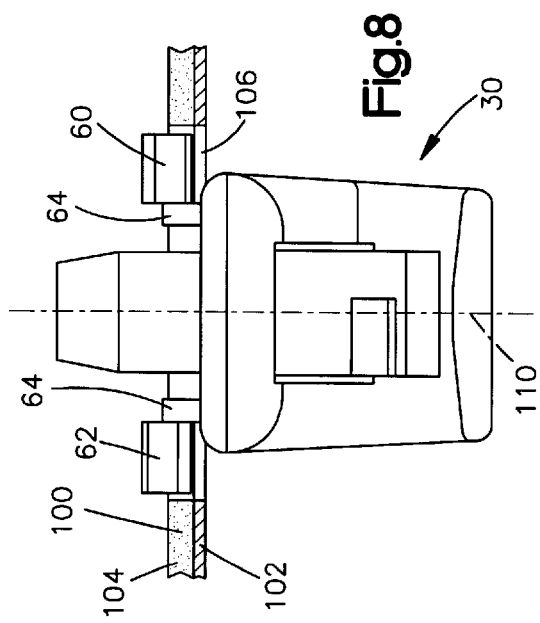
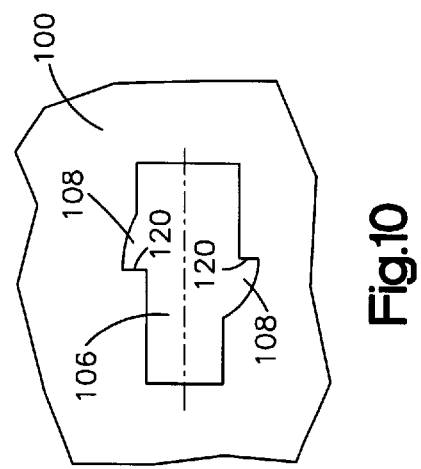

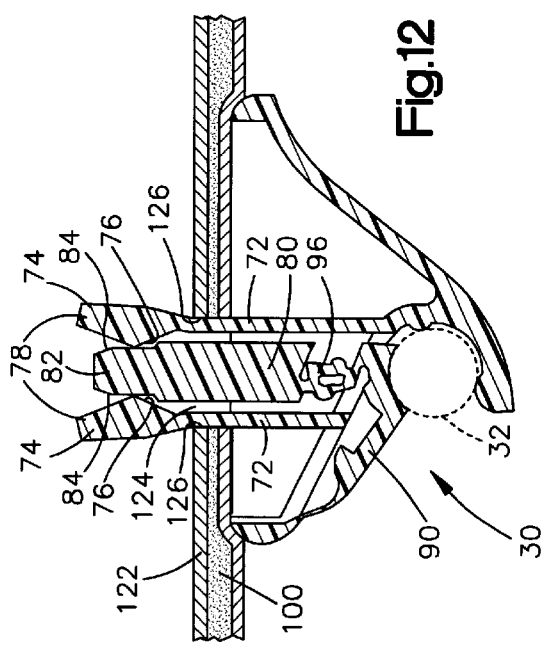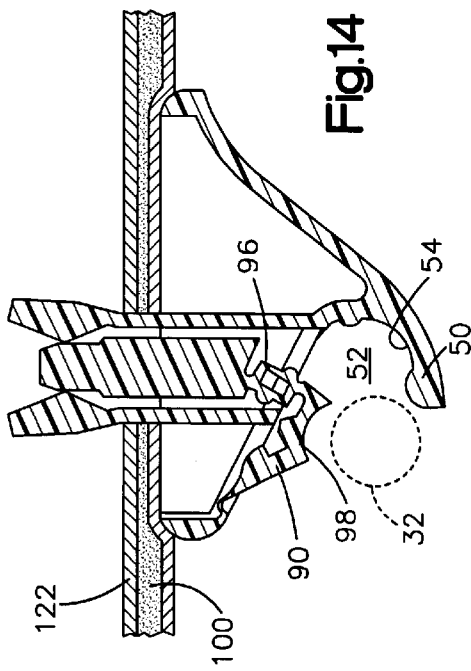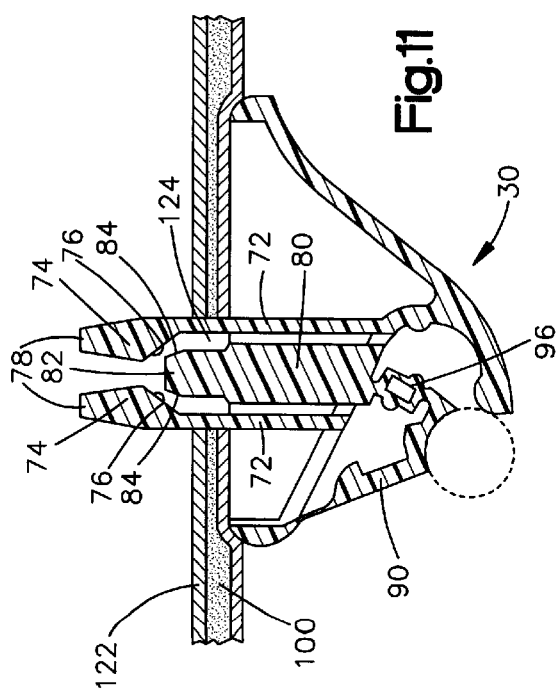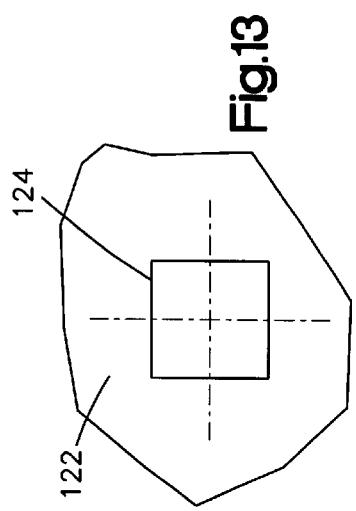

VISOR SUPPORT APPARATUS

TECHNICAL FIELD

The present invention relates to an apparatus for supporting a visor in a vehicle.

BACKGROUND OF THE INVENTION

It is known to support the free end of a vehicle visor with a clip that releasably connects the free end to a roof panel of the vehicle. It is also known to connect the clip to the roof panel using a push-in type fastener. The known push-in type fasteners are typically pins which are pieces separate from the clip. The pins are inserted through an aperture in the clip and bias a part of the clip against the roof panel to connect the clip to the roof panel.

SUMMARY OF THE INVENTION

The present invention relates to an apparatus for supporting a visor in a vehicle that has a roof panel and a headliner that covers the roof panel. The apparatus includes a clip for receiving a part of the visor. The clip includes a body portion. At least one flange extends from the body portion and is insertable into an opening that extends through the headliner and the roof panel such that a portion of the headliner is trapped between the flange and the body portion to connect the clip to the headliner. At least two legs extend from the body portion through the opening. A pin, which is connected to the body portion, is movable from a first position to a second position when the part of the visor is received by the clip. When the pin is in the second position, the pin urges the legs against edges of the opening in the roof panel to connect the clip to the roof panel. The clip, the flange, the legs and the pin are constructed of a single piece of homogeneous material.

BRIEF DESCRIPTION OF THE DRAWINGS

The foregoing and other features of the invention will become more apparent to one skilled in the art upon consideration of the following description of the invention and the accompanying drawings in which:

FIG. 1 is a schematic view of a visor support apparatus installed in a vehicle, according to the present invention;

FIG. 2 is a perspective view of a visor support apparatus, according to a first embodiment of the present invention;

FIG. 3 is a left side elevational view of the visor support apparatus of FIG. 2;

FIG. 4 is a right side elevational view of the visor support apparatus of FIG. 2;

FIG. 5 is a front elevational view of the visor support apparatus of FIG. 2;

FIG. 6 is a sectional view of the visor support apparatus taken generally along line 6—6 in FIG. 5;

FIG. 7 is a sectional view of the visor support apparatus of FIG. 6, depicting parts of the apparatus in different positions;

FIG. 8 is a front elevational view, partially in section, depicting the installation of the visor support apparatus in a vehicle headliner;

FIG. 9 is a side elevational view, partially in section, depicting the installation of the visor support apparatus in a vehicle headliner;

FIG. 10 is a plan view of a vehicle headliner;

FIG. 11 is a sectional view depicting the installation of the visor support apparatus in a vehicle roof panel;

FIG. 12 is a sectional view of the visor support apparatus of FIG. 11, depicting parts of the apparatus in different positions;

FIG. 13 is a plan of a vehicle roof panel;

FIG. 14 is a sectional view of the visor support apparatus of FIG. 11, depicting parts of the apparatus in different positions; and FIG. 15 is a sectional view depicting a visor support apparatus, according to a second embodiment of the present invention.

DESCRIPTION OF THE PREFERRED EMBODIMENTS

FIG. 1 illustrates a vehicle sun visor 10 mounted to a roof structure 12 of a vehicle 14, which includes a roof panel (not shown) and a headliner 16. The visor 10 is shown in a stored position, above the vehicle windshield 18. The visor 10 includes a swivel bracket 20 which connects the visor 10 to the roof structure 12. The bracket 20 allows the visor 10 to pivot downward to a lowered position (not shown) wherein the visor overlies a portion of the windshield 18. The bracket 20 also allows the visor 10 to pivot sideways to a side position (not shown) wherein the visor is positioned adjacent to a side window of the vehicle 14.

According to the present invention, a visor support apparatus 30 is mounted to the roof structure 12 of the vehicle 14. The support apparatus 30 receives a visor pin 32, which extends from the visor 10. The support apparatus 30 releasably connects the visor to the vehicle roof structure 12. The visor pin 32 may rotate within the support apparatus 30 in order to allow the visor 10 to pivot between the stored and lowered positions. The support apparatus 30 releases the visor pin 32 to allow the visor 10 to pivot to and from the side position.

As illustrated in FIGS. 2–4, the visor support apparatus 30 includes a clip 40 which is adapted to receive the visor pin (not shown in FIGS. 2–4). In the illustrated embodiment, the clip 40 includes a body portion 42 having a contoured shape which forms a front surface 44, a rear surface 46, and a generally flat base surface 48. It will be recognized by those skilled in the art, however, that the clip 40 may be of any overall shape designed to provide a desired aesthetic appearance.

The clip 40 also includes a pin receiving portion 50 that extends from the body portion 42 in a direction generally opposite the base surface 44. The pin receiving portion 50 forms a concave pin receiving cavity 52 defined by a pin receiving surface 54. A pin aperture 58 (FIGS. 2 and 5) extends through the body portion 42 of the clip 40, from the front surface 44 to the base surface 48.

The visor support apparatus 30 (FIGS. 2–5) also includes first and second flanges 60 and 62, respectively, which extend from the base surface 48 on opposite sides of the pin aperture 58. The flanges 60 and 62 include stop pieces 64 that connect the flanges to the base surface 48. The first and second flanges 60 and 62 overlie portions of the base surface 44, forming a space between the flanges and the base surface.

Each of the flanges 60 and 62 include a central portion 66, an upturned end portion 68 and a down-turned end portion 70. The central portions 66 extend generally parallel to the base surface 48. The upturned portions 68 extend from the central portion 66 away from the base surface 48. The down-turned portions 70 extend from the central portion 66 towards the base surface 48.

The first and second flanges 60 and 62 are arranged along the pin aperture 58 such that the flanges 60 and 62 are oriented in opposite directions. The upturned end portion 68 of the first flange 60 is positioned directly across the pin aperture 58 from the down-turned end portion 70 of the second flange 62. The down-turned end portion 70 of the first flange 60 is positioned directly across the pin aperture 58 from the upturned end portion 68 of the second flange 62.

As best viewed in FIGS. 6 and 7, the visor support apparatus 30 also includes a pair of legs 72 which are spaced apart from each other and extend from the front surface 44 through the body portion 42. The legs 72 extend perpendicularly from the base surface 48. In the illustrated embodiments, the portions of the legs 72 that extend through the body portion 42 define opposite sides of the pin aperture 58.

Each of the legs 72 includes a protuberance 74 which extends into the pin aperture 58 towards the opposing leg. The protuberances 74 form cam surfaces 76 on each of the legs 72. Each of the legs 72 has a tapered end portion 78 which tapers, from wide to narrow, from the protuberances 74 away from the base surface 48.

The visor support apparatus 30 also includes a retainer pin 80 that is disposed in the pin aperture 58, between the legs 72. The retainer pin 80 is moveable in the pin aperture 58 in a direction parallel to the legs 72 from a first position (FIG. 6) to a second position (FIG. 7). An end portion 82 of the retainer pin 80 protrudes from the base surface 48 between the legs 70 and 72. The end portion 82 of the retainer pin 80 is beveled to form cam surfaces 84.

The visor support apparatus 30 also includes a lever portion 90 having a first end 92 and an opposite second end 94. The first end 92 of the lever portion 90 is hingedly connected to the body portion 42 of the clip 40. The second end 94 of the lever portion 90 is connected to the retainer pin 80 by a hinge portion 96. The second end 94 includes a pin receiving surface 98. The lever portion 90 is movable from a first position (FIG. 6), wherein the lever portion forms an acute angle with the front surface 44 of the body portion 42, to a second position (FIG. 7), wherein the lever portion is positioned substantially parallel to the front surface. As illustrated in FIGS. 6 and 7, the retainer pin 80 is movable within the pin aperture 58 when the lever portion 90 moves from the first position to the second position and vice versa.

The visor support apparatus 30 is constructed of a single piece of homogeneous material. The material may be any suitable plastic or elastomeric material that is capable of being molded and that has a generally resilient quality. As illustrated in FIGS. 2–7, the clip 40, flanges 60 and 62, legs 72, retainer pin 80, lever portion 90 and hinge portion 96 are all part of a single piece of homogeneous material.

The visor support apparatus 30 is configured to be installed on a vehicle headliner prior to the installation of the headliner in the vehicle. As illustrated in FIGS. 8 and 9, the support apparatus 30 is connected to a headliner 100 which includes an outer layer 102, such as a fabric, and an inner layer 104, such as foam padding. It will be recognized by those skilled in the art, however, that the headliner 100 may have alternate constructions. For example, the headliner 100 may include a single layer or more than two layers. The headliner 100 may also be constructed of different materials.

As illustrated in FIG. 8, the visor support apparatus 30 is initially inserted into a cut-out portion 106 of the headliner 100. As illustrated in FIG. 10, the cut-out portion 106 is generally rectangular in shape and includes a pair of arc-shaped recesses 108 on opposite sides of the cut-out portion. The rectangular dimensions of the cut-out portion 106 are such that the flanges 60 and 62 (FIG. 8) and the legs 72 can be inserted through the cut-out portion.

When the visor support apparatus 30 is positioned within the cut-out portion 106 of the headliner 100 such that the flanges 60 and 62 extend through the cut-out portion, the support apparatus is rotated about an axis 110 in order to secure the support apparatus to the headliner. As the support apparatus 30 is rotated about the axis 110, the headliner 100 (FIG. 9) becomes trapped between the flanges 60 and 62 and the base surface 48 of the clip 40. The flanges 60 and 62 are arranged such that, when the support apparatus 30 is rotated, the headliner 100 is initially engaged by the upturned end portions 68 of the flanges. The upturned end portions 68 guide portions 112 of the headliner 100 between the clip 40 and the flanges 60 and 62. The down-turned end portions 70 and the central portions 66 of the flanges 60 and 62 trap the portions 112 of the headliner 100 between the flanges and the base surface 48.

As the visor support apparatus 30 is rotated within the cut-out portion 106, the stop pieces 64 (FIG. 8) move in an arcuate path into the arc-shaped recesses 108 (FIG. 10). The recesses 108 are configured such that the arcuate path along which the stop pieces 64 (FIG. 8) move coincides with the arcuate shape of the recesses. When the stop pieces 64 reach respective end wall portions 120 (FIG. 10) of the recesses 108, further rotational movement of the support apparatus 30 is prevented by the end wall portions. Thus, the orientation of the cut-out portion 106 on the headliner 100 helps to ensure that the support apparatus 30 (FIGS. 8 and 9) will be connected to the headliner in a desired position relative to the headliner.

Once the visor support apparatus 30 is connected to the headliner 100, the support apparatus and the headliner can be installed in a vehicle (not shown). As illustrated in FIGS. 11 and 12, the headliner 100 and the attached support apparatus 30 are positioned such that the headliner covers a roof panel 122 of the vehicle. The roof panel 122 forms a part of the vehicle roof structure and is constructed of a generally rigid material such as sheet metal. The headliner 100 may be connected to the roof panel by known means, such as fasteners. The legs 72 of the support apparatus 30 extend through a mounting aperture 124 which extends through the roof panel 122. As illustrated in FIG. 13, the mounting aperture 124 is rectangular in shape and has dimensions which provide a close fit with the outside dimensions of the legs 72 (FIGS. 11 and 12).

When the visor support apparatus 30 and the headliner 100 are initially installed in the vehicle, the lever portion 90 and the retainer pin 80 remain in the first position. This is shown in FIG. 11. As the apparatus 30 is installed, the tapered shape of the end portions 82 of the legs 72 helps to guide the legs through the mounting aperture 124. Once the support apparatus 30 is positioned such that the legs 72 extend through the mounting aperture 124, the lever portion 90 and the retainer pin 80 are moved to the second position to secure the support apparatus 30 to the roof panel 122. This is shown in FIG. 12.

The lever portion 90 and the retainer pin 80 are moved to the second position by applying a force to the lever portion which causes the lever portion to pivot about the first end 92. In the illustrated embodiment, the force is applied by the visor pin 32. The force may also be applied to the lever portion 90 in a variety of manners, such as by the use of tools or by hand. The hinge portion 96 translates the radial movement of the lever portion 90 to linear movement of the retainer pin 80. As the force is applied to the lever portion 90, the hinge portion 96 bends to a deflected condition shown in FIG. 12. When the force is removed from the lever portion 90, the resilient nature of the material used to construct the hinge portion 96 causes the hinge portion to be restored to its original shape.

As the retainer pin 80 and the lever portion 90 move from the first position of FIG. 11 to the second position of FIG. 12, the cam surfaces 84 on the end portion 82 of the retainer pin 80 engage the cam surfaces 76 of the protuberances 74 on the legs 72. As the retainer pin 80 moves towards the second position, the engagement of the respective cam surfaces 84 and 76 urge the legs 72 in an outward direction to a deflected condition in which the legs engage edges 126 of the mounting aperture 124. This is best shown in FIG. 11.

As the legs 72 are urged outward by the retainer pin 80, the legs apply a force laterally against the edges 126 of the mounting aperture 124. Thus, as the retainer pin 80 moves to the second position, an interference fit is created between the mounting aperture 124, the legs 72, and the retainer pin 80. The interference fit creates a frictional engagement between the legs 72 and the retainer pin 80 which helps to maintain the retainer pin in the second position. Thus, when the applied force is removed from the lever portion 90, the legs 72 are maintained in the deflected condition, which causes the visor support apparatus 30 to be secured to the roof panel 122.

As illustrated in FIG. 14, when the visor support apparatus 30 is connected to the headliner 100 and the roof panel 122, the retainer pin 80 is maintained in the second position and the lever portion 90 is biased towards the first position by the hinge portion 96. This causes the distance between the pin receiving surface 98 of the lever portion 90 and the pin receiving surface 54 of the pin receiving cavity 52 to be smaller than the diameter of the visor pin 32. Thus, as the visor pin 32 is introduced into the pin receiving cavity 52, the lever portion 90 is moved toward the second position, against the bias of the hinge portion 96. This provides a dampened "feel" as the visor pin 32 is inserted into the pin receiving cavity 52.

When the visor pin 32 is inserted into the pin receiving cavity 52, the hinge portion 96 biases the lever portion 90 against the visor pin and helps to secure the visor pin in the pin receiving cavity. When the visor pin 32 is removed from the pin receiving cavity 52, the lever portion 90 is moved against the bias of the hinge portion 96 to release the visor pin. As the visor pin 32 is removed, the bias of the hinge portion 96 creates a dampened "feel."

It may be desirable to remove or uninstall the visor support apparatus 30 from the vehicle roof structure. In order to do so, the retainer pin 80 must be moved to the first position (FIG. 11) so that the legs 72 can be removed from the mounting aperture 124. The lever portion 90 includes a tool slot 130 (FIGS. 2, 3 and 5) which allows for the insertion of a tool (not shown), such as a screwdriver, in order to pry the lever portion and, thus, move the retainer pin 80 towards the first position.

A second embodiment of the present invention is illustrated in FIG. 15. The second embodiment of the invention is similar to the first embodiment of the invention illustrated in FIGS. 1–14. Accordingly, numerals similar to those of FIGS. 1–14 will be utilized in FIG. 15 to identify similar components, the suffix letter "a" being associated with the numerals of FIG. 15 to avoid confusion.

The visor support apparatus 30a (FIG. 15) of the second embodiment is identical to the visor support apparatus 30 (FIGS. 1–14), except that the end portions 82a of the legs 72a (FIG. 15) have a different construction than the end portions 82 of the legs 72 (FIGS. 1–14). Specifically, the end portions 82a of the legs 72a of FIG. 15 include protuberances 140 which extend from the legs in a direction opposite the protuberances 74a.

Each of the protuberances 140 form a guide surface 142 and a retaining surface 144 on the end portions 82a of the legs 72a. When the legs 72a are inserted through the mounting aperture 124a in the roof panel 122a, the guide surfaces 142 engage the edges 126a of the mounting aperture and bias the legs towards each other. This allows the legs 72a to enter the mounting aperture 124a. As shown in FIG. 15, when the retaining pin 80a is in the second position and the legs 72a are deflected outwards, the retaining surfaces 144 of the protuberances 140 secure the support apparatus 30a to the roof panel 122a. The retaining surfaces 144 engage the roof panel 122a to help connect the support apparatus 30a to the roof panel. The retaining surfaces 144 help to provide a secure connection of the support apparatus 30a to the roof panel 122a.

From the above description of the invention, those skilled in the art will perceive improvements, changes and modifications. Such improvements, changes and modifications within the skill of the art are intended to be covered by the appended claims.

Having described the invention, the following is claimed:

1. Apparatus for supporting a visor in a vehicle having a roof panel and a headliner that covers the roof panel, said apparatus comprising:

a clip for receiving a part of the visor, said clip including a body portion;

at least two legs which extend from said body portion through an opening that extends through the headliner and the roof panel; and said clip including a pin movable from a first position to a second position when said part of the visor is received by said body portion, said pin urging said at least two legs towards edges of said opening in the roof panel to connect said clip to the roof panel when said pin is in said second position.

2. Apparatus as defined in claim 1, wherein said clip includes at least one flange that extends from said body portion, said at least one flange being insertable through said opening, a portion of the headliner being trapped between said at least one flange and said body portion to connect said clip to the headliner.

3. Apparatus as defined in claim 2, further comprising a lever portion having a first end which is hingedly connected to said body portion, said lever portion having a second end which is connected to said pin, said part of said visor engaging said lever portion and causing said lever portion to pivot relative to said body portion, said lever portion moving said pin from said first position to said second position when said part of said visor is received by said clip.

4. Apparatus as defined in claim 3, wherein said lever portion is adapted to receive a tool for prying said lever portion to move said pin from said second position to said first position.

5. Apparatus as defined in claim 3, wherein said lever portion is biased to move said pin to said first position.

6. Apparatus as defined in claim 3, wherein said clip, said at least one flange, said at least two legs, said pin and said lever portion are constructed of a single piece of homogeneous material.

7. Apparatus as defined in claim 6, wherein said single piece of homogeneous material is a molded plastic material.

8. Apparatus as defined in claim 1, wherein said at least two legs frictionally engage said pin when said pin is in said second position to resist movement of said pin towards said first position.

9. Apparatus as defined in claim 1, wherein said part of said visor is a visor pin.

10. Apparatus for supporting a visor in a vehicle having a roof panel and a headliner that covers the roof panel, said apparatus comprising:

a clip for receiving a part of the visor, said clip including a body portion;

at least one flange extending from said body portion, said at least one flange being insertable through a first opening that extends through the headliner, a portion of the headliner being trapped between said at least one flange and said body portion to connect said clip to the headliner;

at least two legs which extend from said body portion through said first opening, said at least two legs extending through a second opening that extends through the roof panel; and a pin connected to said body portion and movable from a first position to a second position, said pin urging said at least two legs towards edges of said second opening in the roof panel to connect said clip to the roof panel when said pin is in said second position; and a lever portion having a first end which is hingedly connected to said body portion, said lever portion having a second end which is connected to said pin, said part of said visor engaging said lever portion and causing said lever portion to pivot relative to said body portion, said pin moving from said first position to said second position when said part of said visor is received by said clip.

11. Apparatus as defined in claim 10, wherein said lever portion is adapted to receive a tool for prying said lever portion to move said pin from said second position to said first position.

12. Apparatus as defined in claim 10, wherein said lever portion is biased to move said pin to said first position.

13. Apparatus as defined in claim 10, wherein said clip, said at least one flange, said at least two legs, said pin and said lever portion are constructed of a single piece of homogeneous material.

14. Apparatus as defined in claim 13, wherein said single piece of homogeneous material is a molded plastic material.

15. Apparatus for supporting a visor in a vehicle having a roof panel and a headliner that covers the roof panel, said apparatus comprising:

a clip for receiving a part of the visor, said clip including a body portion;

at least two legs which extend from said body portion through an opening in the headliner and the roof panel;

said clip including a pin movable from a first position to a second position wherein said pin urges said at least two legs towards edges of said opening in the roof panel to connect said clip to the roof panel;

said body portion, said pin, and said at least two legs being constructed of a single piece of homogeneous material;

at least one flange that extends from said body portion, said at least one flange being insertable through said opening, a portion of the headliner being trapped between said at least one flange and said body portion to connect said clip to the headliner; and a lever portion having a first end which is hingedly connected to said body portion, said lever portion having a second end which is connected to said pin, said part of said visor engaging said lever portion and causing said lever portion to pivot relative to said body portion, said pin moving from said first position to said second position when said part of said visor is received by said clip.

16. Apparatus as defined in claim 15, wherein said lever portion is adapted to receive a tool for prying said lever portion to move said pin from said second position to said first position.

17. Apparatus as defined in claim 15, wherein said lever portion is biased to move said pin to said first position.

18. Apparatus as defined in claim 15, wherein said clip, said at least one flange, said at least two legs, said pin and said lever portion are constructed of a single piece of homogeneous material.

19. Apparatus as defined in claim 18, wherein said single piece of homogeneous material is a molded plastic material.

20. Apparatus for supporting a visor in a vehicle having a roof panel and a headliner that covers the roof panel, said apparatus comprising:

a clip for receiving a part of the visor, said clip including a body portion;

at least one flange extending from said body portion, said at least one flange being insertable through a first opening that extends through the headliner, a portion of the headliner being trapped between said at least one flange and said body portion to connect said clip to the headliner;

at least two legs which extend from said body portion through said first opening, said at least two legs extending through a second opening that extends through the roof panel;

a pin being received between said at least two legs and biasing said at least two legs against edges of said second opening in the roof panel to connect said clip to the roof panel; and a lever portion having a first end that is hingedly connected to said body portion and a second end that is hingedly connected to said pin;

the lever portion being movable relative to said pin and said body portion between a first position for receiving said part of the visor and a second position for retaining said part of said visor.

21. Apparatus as defined in claim 20, wherein said body portion includes a front surface, said lever portion forming an acute angle relative to said front surface when in said first position, said lever portion being substantially parallel to said front surface when in said second position.

22. Apparatus as defined in claim 20, wherein said body portion includes a pin receiving surface and said lever portion includes a pin receiving surface, a distance between said pin receiving surface of said body portion and said pin receiving surface of said lever portion being smaller than a diameter of said part of said visor when said lever portion is in said first position.

23. Apparatus as defined in claim 20, wherein a hinge portion hingedly connects said second end of said lever portion to said pin, said hinge portion biasing said lever portion toward said first position.

24. Apparatus as defined in claim 23, wherein said hinge portion biases said lever portion against said part of the visor to retain said part in said clip when said lever portion is in said second position.

25. Apparatus as defined in claim 20, wherein said lever portion is adapted for receiving a tool for moving said lever portion to remove said pin from between said at least two legs.

26. Apparatus as defined in claim 20, wherein said body portion, said lever portion, said pin, and said at least two legs are constructed of a single piece of material.

27. Apparatus for supporting a visor in a vehicle having a roof panel and a headliner that covers the roof panel, said apparatus comprising:

- a clip for receiving a part of the visor, said clip including a body portion;
- at least two legs which extend from said body portion through an opening in the headliner and the roof panel;
- a pin being received between said at least two legs and biasing said at least two legs against edges of said opening in the roof panel to connect said clip to the roof panel; and
- a lever portion having a first end that is hingedly connected to said body portion and a second end that is hingedly connected to said pin;
- the lever portion being movable relative to said pin and said body portion between a first position for receiving said part of the visor and a second position for retaining said part of said visor.

28. Apparatus as defined in claim 27, wherein said body portion includes a front surface, said lever portion forming an acute angle relative to said front surface when in said first position, said lever portion being substantially parallel to said front surface when in said second position.

29. Apparatus as defined in claim 27, wherein said body portion includes a pin receiving surface and said lever portion includes a pin receiving surface, a distance between said pin receiving surface of said body portion and said pin receiving surface of said lever portion being smaller than a diameter of said part of said visor when said lever portion is in said first position.

30. Apparatus as defined in claim 27, wherein a hinge portion hingedly connects said second end of said lever portion to said pin, said hinge portion biasing said lever portion toward said first position.

31. Apparatus as defined in claim 30, wherein said hinge portion biases said lever portion against said part of the visor to retain said part in said clip when said lever portion is in said second position.

32. Apparatus as defined in claim 27, wherein said lever portion is adapted for receiving a tool for moving said lever portion to remove said pin from between said at least two legs.

33. Apparatus as defined in claim 27, wherein said body portion, said lever portion, said pin, and said at least two legs are constructed of a single piece of material.

* * * * *